US008226019B2

(12) United States Patent
Andersen

(10) Patent No.: US 8,226,019 B2
(45) Date of Patent: Jul. 24, 2012

(54) SYSTEMS FOR ISOTROPIC QUANTIZATION SORTING OF AUTOMOBILE SHREDDER RESIDUE TO ENHANCE RECOVERY OF RECYCLABLE RESOURCES

(75) Inventor: Dean R. Andersen, Greeley, CO (US)

(73) Assignee: Dean Andersen Trust, Greeley, CO (US)

(*) Notice: Subject to any disclaimer, the term of this patent is extended or adjusted under 35 U.S.C. 154(b) by 0 days.

(21) Appl. No.: 13/274,328

(22) Filed: Oct. 15, 2011

(65) Prior Publication Data
US 2012/0032008 A1 Feb. 9, 2012

(51) Int. Cl.
B02C 23/20 (2006.01)

(52) U.S. Cl. .......... 241/19; 209/135; 241/20; 241/24.14

(58) Field of Classification Search ................ 209/12.1, 209/3, 30, 38, 39, 135; 241/DIG. 38, 19, 241/79.1, 100, 24.14
See application file for complete search history.

(56) References Cited

U.S. PATENT DOCUMENTS

| | | | |
|---|---|---|---|
| 1,953,948 A | 4/1934 | Bieth | |
| 2,978,103 A * | 4/1961 | Cowher, Sr. | 209/135 |
| 3,042,202 A | 7/1962 | Work | |
| 3,643,797 A * | 2/1972 | Berkowitz et al. | 209/2 |
| 3,682,302 A | 8/1972 | Bernutat | |
| 3,848,813 A | 11/1974 | Stanczyk et al. | |
| 3,856,217 A | 12/1974 | Brewer | |
| 3,972,481 A | 8/1976 | Naporano et al. | |
| 3,972,808 A | 8/1976 | Manley | |
| 4,139,454 A | 2/1979 | Larson | |
| 4,312,748 A | 1/1982 | Rozmus | |
| 4,313,910 A | 2/1982 | Dries et al. | |
| 4,378,234 A | 3/1983 | Suzuki et al. | |
| 4,418,871 A * | 12/1983 | Powell | 241/1 |
| 4,692,167 A | 9/1987 | Levasseur | |
| 4,721,457 A | 1/1988 | Areaux et al. | |
| 4,891,129 A | 1/1990 | Barnes | |
| 4,894,148 A | 1/1990 | Frei | |
| 5,032,256 A * | 7/1991 | Vickery | 209/135 |
| 5,443,157 A * | 8/1995 | Baker et al. | 209/12.1 |
| 5,938,803 A | 8/1999 | Dries | |
| 6,422,493 B1 | 7/2002 | Simon et al. | |
| 6,830,734 B1 | 12/2004 | Dirkse et al. | |
| 6,846,463 B1 | 1/2005 | Dries et al. | |
| 7,108,138 B2 | 9/2006 | Simpson | |
| 7,905,946 B1 | 3/2011 | Weislogel et al. | |
| 2003/0129077 A1 | 7/2003 | Koch et al. | |
| 2006/0243645 A1 | 11/2006 | Josephs | |

OTHER PUBLICATIONS

Scrap, vol. 68, No. 3, May/Jun. 2011.
Scrap Specification Circular, Institute of Scrap Recycling Industries, Inc., Apr. 7, 2008.
Eddy current separator for metal separation, www.cogelme.com/eng/e-eddy-current-metal-separator-htm, printed Oct. 11, 2011.

(Continued)

Primary Examiner — Mark Rosenbaum
(74) Attorney, Agent, or Firm — Santangelo Law Offices, P.C.

(57) ABSTRACT

Systems and methods for increasing recyclable material recovery from automobile shredder residue. Embodiments include substantially isotropic quantization separation of automobile shredder residue such as a wind tunnel system and even substantially horizontal laminar air flow and can be used with or without out other traditional automobile shredder residue sorting systems perhaps creating additional recyclable quantities and even better separated results such as with zorba and zurik and the like.

20 Claims, 3 Drawing Sheets

OTHER PUBLICATIONS

General Kinematics, Dual-Knife De-Stoner Air classifier; www.generalkinematics.com/recycling/proddesc.cfm/productid/105, 2 pages, printed Feb. 7, 2012.

General Kinematics, Single Knife De-Stoner Air classifier; www.generalkinematics.com/recycling/proddesc.cfm/productid/29, 2 pages, printed Feb. 7, 2012.

Triple/S Dynamics, Inc. www.sssdynamics.com Stoner Model S-30J, 2 pages printed Feb. 7, 2012.

Triple/S Dynamics, Inc. www.sssdynamics.com Pace Stoner Model S-25, 2 pages printed Feb. 7, 2012.

Triple/S Dynamics, Inc. www.sssdynamics.com Stoner Model S-22H, 2 pages printed Feb. 7, 2012.

Airsort, Highly Accurate Z-box Air Classifier; Sicon brochure received on Apr. 18, 2012 at the ISRI Convention and Exposition in Las Vegas from Apr. 15-19, 2012; 2 Pgs.

* cited by examiner

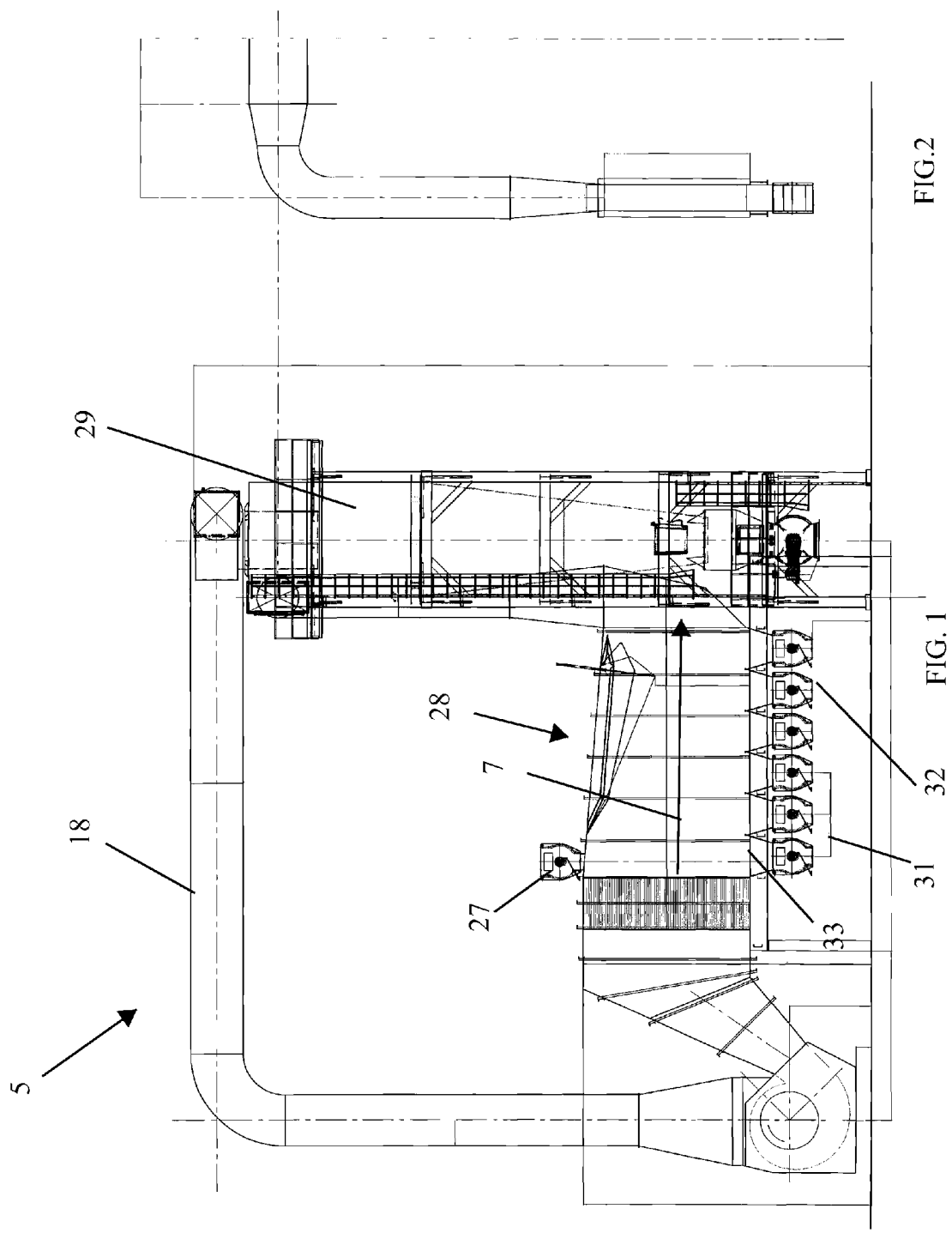

SYSTEMS FOR ISOTROPIC QUANTIZATION SORTING OF AUTOMOBILE SHREDDER RESIDUE TO ENHANCE RECOVERY OF RECYCLABLE RESOURCES

FIELD OF THE INVENTION

The present invention relates to systems and methods for enhanced recovery of recyclable materials from automobile shredder residue. More specifically, the present invention relates to substantially isotropic quantization sorting systems of automobile shredder residue providing additional recyclable materials, less waste, and even better quality of the separated products.

BACKGROUND OF THE INVENTION

Recycling may be a key component of modern waste reduction and may help sustain the environment for future generations. Recycling efforts can prevent waste of potentially useful materials, reduce the consumption of raw materials, reduce energy usage, and the like. According to estimates from the automotive industry, 95% of all motor vehicles removed from service are processed for recycling. This equates to approximately 9 to 10 million vehicles each year. In the recycling process, cars may be dismantled and stripped of reusable parts. The stripped cars may be sent to auto shredding operations where automobile shredders such as hammermills crush them into smaller pieces. Metal chunks are recovered and sold to metal scrap and nonferrous metal processing industries. On average 75% of a vehicle by weight is recycled. The remaining 25% of the vehicle is commonly landfilled. Major household appliances can also be recycled but create residues that cannot be recycled. The remaining material from the recycling of automobiles, trucks, buses and common household appliances such as washers, dryers and refrigerators and the like is called automobile shredder residue also known as auto fluff, or auto shredder fluff. It is estimated that 2 billion pounds of automobile shredder residue are generated annually.

Realistically, automobile shredder residue contains recyclable components such as plastics and metals mixed in with trash and magnetic fuzz. It is desirable to provide a system that can further process automobile shredder residue to separate the recyclable components in a form that can be used for recycling. Previous particle classification systems such as discussed in U.S. Pat. No. 3,972,808 to Manley and U.S. Pat. No. 4,312,748 to Rozmus, both hereby incorporated by reference herein, would not work with automobile shredder residue among other reasons. Manley was designed for mineral and mine run materials and Rozmus was designed for powders and metal powders. Unlike automobile shredder residue, minerals, mine run minerals, and powders may be somewhat homogenous pre-classification. Automobile shredder residue may be a seemingly homogenous substance but may actually have a lot of various materials and maybe somewhat heterogeneous containing different substances such as glass, fabric, metals, dirt, plastics, rubber, trash, and the like. Separation of automobile shredder residue is very different from minerals, mine run materials, and powders.

Other systems have been developed to recover recyclable components from automobile shredder residue. Such traditional systems include magnets, eddy current, air separation, flotation, screening, sensor sorting, induction sensor sorting, and X-ray. However, these traditional systems still produce end products that contain recyclable components which end up as waste in a landfill. The traditional sorting systems for automobile shredder residue also provide recyclable products which may be unclean perhaps making the recycling process less efficient. Therefore, there is a need for a system to enhance separation of recyclable materials from auto shredder residue to provide cleaner recyclable products and more recyclable products from what would otherwise be trashed.

Unlike past systems which may only afford incremental increases in the recovery of recyclable materials from auto shredder residue, the present invention utilizes techniques which were not previously considered to achieve impressive sorting results compared to the prior art.

SUMMARY OF THE INVENTION

The present invention discloses systems for substantially isotropic quantization separating of automobile shredder residue. Specifically, horizontal laminar air flow may be provided in a wind tunnel system so that materials such as automobile shredder residue can be effectively sorted into collections of substantially isotropic quantized materials.

It is therefore broadly an object of the present invention to provide methods and systems to increase sorting of recyclable materials from automobile shredder residue to reduce waste and landfill.

It is another object of the present invention to provide cleaner recyclable materials from the sorting of automobile shredder residue to perhaps increase efficiency in the recycling process.

It is yet another object of the present invention to provide a wind tunnel sorting system for separation of recyclable materials from automobile shredder residue.

Another object of the present invention provides the use of sorting systems of the present invention together with other traditional systems.

It is another object of the present invention to process automobile shredder residue in a substantially isotropic quantization separation system and then process with subsequent sorting systems.

It is yet another object of the present invention to process automobile shredder residue in initial sorting systems and then process with a substantially isotropic quantization separation system.

It is another object of the present invention to provide enhanced recyclable materials recovered from automobile shredder residue including recyclable metals and plastics.

Naturally, further objects of the invention are disclosed throughout other areas of the specification, drawings, and claims.

BRIEF DESCRIPTION OF THE DRAWINGS

The following description and referenced drawings are for selected embodiments of the present invention. Naturally, changes may be made to the disclosed embodiments while still falling within the scope and spirit of the present invention.

FIG. 1 shows an embodiment of the invention of a substantially isotropic quantization separation system.

FIG. 2 shows an end view of a substantially isotropic quantization separation system.

DETAILED DESCRIPTION OF THE PREFERRED EMBODIMENTS

Figure 3:
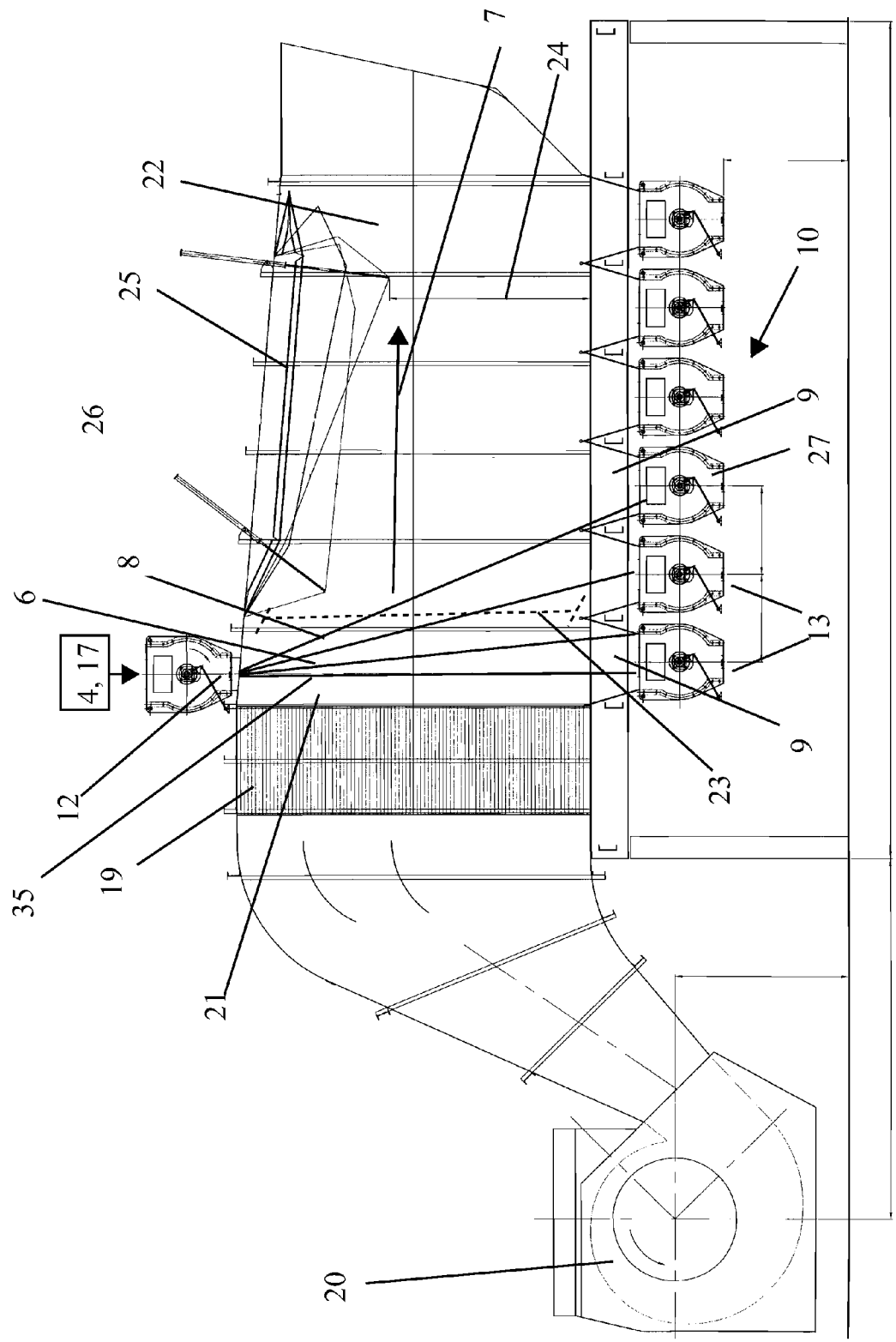
FIG. 3 shows an embodiment of the invention of a wind tunnel.

The present invention includes a variety of aspects, which may be combined in different ways. The following descriptions are provided to list elements and describe some of the embodiments of the present invention. These elements are listed with initial embodiments, however it should be understood that they may be combined in any manner and in any number to create additional embodiments. The variously described examples and preferred embodiments should not be construed to limit the present invention to only the explicitly described systems, techniques, and applications. Further, this description should be understood to support and encompass descriptions and claims of all the various embodiments, systems, techniques, methods, devices, and applications with any number of the disclosed elements, with each element alone, and also with any and all various permutations and combinations of all elements in this or any subsequent application.

Embodiments of the present invention may provide methods for enhanced separation of automobile shredder residue comprising: providing automobile shredder residue from an automobile shredder and metal reclamation process; introducing said automobile shredder residue into a wind tunnel sorting system; providing a gravitationally driven descent of said automobile shredder residue in said wind tunnel sorting system; horizontally laminar flowing air through said wind tunnel sorting system; dynamically influencing said gravitationally driven descent of at least some of said automobile shredder residue with said horizontally laminar flowing air so that at least some of said automobile shredder residue is carried with said laminar flowing air in said wind tunnel sorting system; substantially isotropic quantization separating said automobile shredder residue in said wind tunnel sorting system by said horizontally laminar flowing air scattering said automobile shredder residue; and perhaps even categorizingly collecting said automobile shredder residue as said automobile shredder residue variably descends in said wind tunnel sorting system.

Apparatus for enhanced separation of automobile shredder residue may include a plurality of automobile shredder residue; a substantially isotropic quantization sorting system; an automobile shredder residue introduction element in said substantially isotropic quantization sorting system; a horizontal laminar air flow in said substantially isotropic quantization sorting system; and perhaps even at least one collection of substantially isotropic quantized materials generated from said automobile shredder residue influenced by said horizontal laminar air flow.

Automobile shredder residue may be the leftover materials from an automobile shredder and metal reclamation process. As may be understood from FIG. 4, shredder materials (26) such as but not limited to automobiles, trucks, buses, household appliances, washers, dryers, refrigerator, sheet metal, scraps, and waste metal may be fed into an automobile shredder system (1) where the shredder material may be shredded into a plurality of shredded pieces (2). A shredder system may include a huge and powerful machine or machines such as a hammermills capable of crushing the shredder materials into smaller pieces. After shredded pieces (2) may be removed from a shredder, metals such as ferrous metals may be separated from the mass of the material with a sorter such as a magnetic sorter (11). A magnetic sorter may be a powerful magnet or plurality of magnets or even a large magnetic roller, or the like. The magnetic sorter may be responsive to the plurality of shredded pieces to generate a collection of ferrous metals (3) which may then be recycled. The leftover collection of material may be the automobile shredder residue (4). Most of the recyclable components in automobile shredder residue may be non-ferrous metals (such as stainless steel, copper, brass, zinc, aluminum, lead, and the like) but may also have some ferrous metals mixed in as well. Automobile shredder residue may include a variety of materials such as but not limited to magnetic fuzz, dirt, non-metallic waste, trash, metals, ferrous metals, nonferrous metals, light trash, heavy trash, glass, plastic, wood, aluminum, copper, zinc, brass, lead, stainless steel, magnesium, nickel, tin, insulated copper wire, any combination thereof, or the like.

Embodiments of the present invention may provide a substantially isotropic quantization sorting system responsive to and even capable of sorting automobile shredder residues and components within. By responsive, a sorting system may react, may be used with or perhaps even may be desirable for use with automobile shredder residues. A substantially isotropic quantization sorting system may provide sorting of heterogeneous materials into substantially uniform collections perhaps with discrete values or characteristics. Substantially isotropic quantization separating with automobile shredder residues and materials may provide divided subparts which may be discrete, substantially constrained, substantially concentrated, substantially homogenous, or perhaps even substantially categorized from the whole. In one respect, automobile shredder residue may be considered waste prior to sorting and after substantially isotropic quantization sorting, the sorted collections resulting there from may be recyclable perhaps even in the form of zorba, zurik, and the like. Therefore, various embodiments of the present invention may provide a substantially homogenous separation system or even a substantially concentrated separation system or the like which may result in substantially homogenous materials, substantially concentrated materials, or the like.

In embodiments, a substantially isotropic quantization sorting system may include a wind tunnel sorting system (5) as shown in FIGS. 1, 2 and 3. A wind tunnel sorting system may provide sorting of materials such as automobile shredder residue or other products from automobile shredder residue (e.g., separated materials, zorba, zurik, or the like) in a fashion which may effectively and even efficiently provide separation of recyclable materials from automobile shredder residue. For example, automobile shredder residue (4), shredder materials (17), or the like may be introduced into a wind tunnel sorting system (5) perhaps at an introduction element (12) so that the materials can be processed in a system. Laminar air flow (7) which may or may not be horizontal may be provided in a system that may influence, perhaps even dynamically influence the materials. Influence upon the materials may produce a force resulting in desired sorting effects. Some of the materials may be carried, pushed, or even scattered by the laminar air flow so that any initial vertical gravitationally driven descent may dynamically change perhaps based on the weight of the materials, the force of the air flow, and perhaps even the direction of the air flow. Dynamic influence on the materials may provide categorized collections of the automobile shredder residue as the residue may variably descend in the wind tunnel sorting system. At least one collection of substantially isotropic quantized materials (9) may be generated from the system as influenced by the laminar air flow.

The materials may be introduced into a wind tunnel sorting system in any fashion including but not limited to vertically, horizontally, from a top, from a bottom, from a side, diagonally or the like. As shown in FIG. 3, an introduction element (12) may be located at a top of a wind tunnel and may even be an air lock (27) permitting passage of the materials into a wind tunnel system but in which the system may be kept under pressure. After materials are introduced into the wind tunnel system, the materials may gravitationally descend into a wind tunnel (28) perhaps with a gravitationally driven descent (6) as may be understood in FIG. 3. In embodiments, air locks may be provided at or near the collection of sorted materials perhaps at a bottom of a system.

Sorting of automobile shredder residues in a wind tunnel sorting system may provide sorting of heavier materials from lighter materials. For example, the heavier materials may descend substantially vertically (6) into a collection of heavy materials and even a container element (13) thereof. The heavy materials may not be influenced by the air flow. However, lighter materials may be dynamically influenced by an air flow and may be pushed or carried downstream perhaps from an introduction section and may be scattered into a plurality of downstream container elements to provide a plurality or even a series (10) of collections of substantially isotropic quantized materials (9). As shown in FIG. 3, an example of a descent (6) of a material is shown where the heaviest materials may fall in a substantially vertical (35) fashion and lighter materials may be dynamically influenced by an air flow and carried (8) downstream. The materials may be funneled into a collection area. Accordingly, embodiments of the present invention may provide a series of collections of materials perhaps in a series of containers or conveyer belts where the heavier materials (31) may be collected upstream and the lighter materials (32) may be collected downstream. A container (13), which for purposes of illustration may be placed under an air lock as shown in FIG. 3 and may be any kind of containing or even carrying element to allow collections of materials to be contained and perhaps even transported via a conveyer belt, moving carrier, or the like.

In embodiments, a series of containers may be located at a bottom (33) of a wind tunnel and may even be arranged along a direction of air flow to perhaps provide collection of materials of different weights in each container. The collected materials may include separated heavy materials, separated light materials, separated trash materials, separated mixed heavy materials, or the like. Any number of containers may be used such as but not limited to at least 2, at least 3, at least 4, at least 5, at least 6, at least 7, at least 8, greater than 2, less than 10 containers, more then 10 containers, or the like. At least one container may be used as well depending on the needs of the system.

Heavier materials may include but are not limited to recyclable materials, metals, ferrous metals, nonferrous metals, heavy trash, glass, plastic, wood, aluminum, copper, zinc, brass, lead, stainless steel, and the like; and lighter materials may include but are not limited to trash, magnetic fuzz, dirt, and the like.

Laminar air flow may be a smooth air flow created with an air aligner (19) which may be a plurality of tubes located between an air current source element (20) and a material introduction element (12). The tubes may be steel tubes, plastic tubes, rubber tubes or the like. An air aligner may be positioned so that laminar air flow may be created in a desired direction or even in a direct configuration with a material. Laminar air flow may be streamlined and may be an undisrupted or even substantially turbulent free air flow. An air source element (20) may be a fan, blower, ventilator or even any device which may produce a current of air. Air flow in a wind tunnel system may have an air velocity which may be selected based on the type of materials processed. In some embodiments, a non-limited example of air velocity may include between about 15 and about 60 miles per hour, between about 15 and about 35 miles per hour, about 28 miles per hour, between about 35 and about 60 miles per hour, about 40 miles per hour, or the like. Of course, any air velocity value may be used and all are meant to be included in the scope of this application. Air velocity of a laminar air flow may be constant or may even be variable. The air velocity may be variably changed during use of the wind tunnel system perhaps that it may be increased or decreased during use.

In embodiments, an air velocity may have different values at different locations in a wind tunnel sorting system. This may dynamically influence the materials as they may be carried in a laminar air flow and may even provide better separation of the materials. As but one example, an air velocity may be different at a material introduction section (21) than at a downstream section (22). An material introduction section may have an air velocity such as but not limited to between about 15 and about 35 miles per hour, about 28 miles per hour, and between about 25 and about 40 miles per hour, or the like. A downstream section may have an air velocity such as but not limited to between about 35 and about 60 miles per hour, about 40 miles per hour, between about 30 and about 60 miles per hour, and the like. As mentioned above, all options for air velocity may be used and are meant to be included in this disclosure. In providing different air velocities within a wind tunnel, the present invention may utilize an internal volume (23) at or near a material introduction section that may be greater than an internal volume (24) at or near a downstream section. As shown in FIG. 3, six separation sections are provided as a non-limiting example. The horizontal laminar air flow (7) may flow but is not limited to flow from the left to the right influencing materials introduced from the introduction element (12). The heaviest materials may descend almost vertically down (35) into a first collection container. The lighter materials may be carried and may descend into one of the remaining series of containers effectually sorting out the heaviest materials from the lightest materials. The air flow in the downstream sections may be increased by restricting the volume space within the wind tunnel as shown in FIGS. 1 and 3. The housing of a wind tunnel may be narrowed perhaps by lowering a roof section (25) for those sections of the wind tunnel that desire an increase air flow velocity. Adjustment of the housing may be provided perhaps by adjusting the degree to which a roof section may be lowered.

In embodiments, a wind tunnel sorting system may have a rectangular cross section of a wind tunnel. Other shapes may be used such as circular, square, combinations thereof and the like. As shown in FIG. 1, a substantially isotropic quantization sorting system (5) such as a wind tunnel sorting system may be a closed loop system perhaps providing continuous circulation of the air flow and even in an air locked system. As mentioned above, an air lock (27) may be provided at a material introduction element and may even be provided where separated materials exit the system such as shown in FIG. 3. An air locked system may be important in providing adequate air flow and direction of the air flow within the system. As mentioned earlier, air flow may be generated from an air current source (20) where a fan may blow air through an air aligner (19) to create a horizontal laminar air flow into a wind tunnel (28) of a system. Materials (4, 17) introduced in the introduction element (12) may descend into the wind tunnel and may ultimately be separated into a series of collections of materials. The air flow, after passing through the wind tunnel, may then exit the wind tunnel and may proceed into a cyclone (29). Light materials may remain in the air flow and may even be carried into the cyclone (29). In the cyclone, the light materials may be filtered out to remove the light materials and provide a clean air flow such that a cyclone (29) may be a light material removal element in some embodiments. The filtered air may exit the cyclone and may be channeled (18) back to the air current source (20) perhaps providing a closed loop system, a continuous air flow system or perhaps even recycling with an air recycling element or recirculation element of the air flow within a system.

When separating recyclable materials from automobile shredder residue, embodiments of the present invention provide separating an amount of waste in the automobile shredder residue from recyclable materials. While any amount of separation of waste from recyclable materials is available and all are included in this scope of this application, the amount of waste which may be separated from automobile shredder residue may depend on the type of automobile shredder residue. Thus, perhaps depending on the type of cut size used in a substantially isotropic quantization separation system, the amount of waste may differ. As a non-limiting example, an amount of waste removed from automobile shredder residue may include between about 80% and about 90%, greater than about 75%, less than about 90%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, about 95%, or the like. In another non-limiting example, an amount of waste removed from automobile shredder residue could be about 20% to about 40%, at least about 20%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, about 40%, or the like. More waste may be removed from fine sized automobile shredder residue (perhaps up to 95% waste removal) than from medium sized automobile shredder residue (perhaps up to 40% waste removal).

In embodiments, automobile shredder residue may be screened through a sizing element so that particles of the automobiles shredder residue may be separated and even sized into desired cut sizes. This may vary depending on the specific system and any kind of sizing option may be used. As a non-limiting example, automobile shredder residue may be run through a sizing machine, or even a plurality of sizing machines to create perhaps three groups of cut sizes such as large size, medium size, and even fine size. A large size may be between about 2 inches and about 5 inches, greater than about 2 inches, between about 2 inches and about 7 inches, or the like. A medium size may be between about ⅞ inch and about 2 inches; and a fine size may be less than about ⅞ inch, about ¾ inch, about ½ inch, or the like. As a non-limiting example, embodiments of the present invention may provide optimal separation of automobile shredder residue when sizes of less than about 2 inches are introduced into a system such as a wind tunnel sorting system.

Some important factors of the present invention may provide decreasing an amount of automobile shredder residue disposal and even increasing an amount of recyclable materials as may be recovered from automobile shredder residue. Recyclable material recovered from automobile shredder residue may include but is not limited to metals, nonferrous metals, ferrous metals, aluminum, copper, zinc, brass, lead, stainless steel, magnesium, nickel, tin, insulated copper wire, zorba, zurik, polymers, plastic, any combination thereof, or the like. As a non-limiting example, between about 5% and about 20%, up to about 10%, up to about 20%, up to about 25%, up to 30% of said automobile shredder residue can be removed as recyclable materials thus reducing landfill and waste and even increasing a recyclable amount of materials.

Since the amount of recyclable materials recovered may be increased, a monetary amount may be associated with the increase based on the systems or methods as discussed herein in the various embodiments. As a non-limiting example, between about $8.00 USD and about $20.00 USD per ton of shredded material may be additionally recovered based on the amount of salable additionally recovered recyclable materials as compared to past techniques. Of course, these values may vary with the market and with the amount of recyclables recovered; however it may provide a substantial increase in salable materials.

As recyclable materials are sorted from automobile shredder residue, they may be sorted as separated materials such as metals, plastics, zorba, zurik, nonferrous trash, any combination thereof and the like. Zorba may be shredded nonferrous scrap of any combination of aluminum, copper, lead, magnesium, stainless steel, nickel, tin, and zinc, in elemental or alloyed (solid) form and may even be resulting material generated by traditional sorting processes such as eddy current, air separation, flotation, screening, or other segregation techniques or a combination thereof. Zurik may be shredded nonferrous sensor sorted scrap of any combination of stainless steel, insulated copper wire, aluminum, copper, lead, magnesium, nickel, tin, and zinc, in elemental or alloyed (solid) form and may even be resulting material generated by computer sensing equipment such as but not limited to induction sensor sorting or X-ray techniques. Other requirements may apply to zorba and zurik such as having been passed through one or more magnets to reduce or even eliminate free iron and/or large iron attachments, perhaps fee of radioactive material, dross, or ash, or the like requirements.

As mentioned herein, embodiments of the present invention may provide a combination of automobile shredder residue sorting systems when recovering recyclable materials from automobile shredder residue. A substantially isotropic quantization sorting system such as a wind tunnel sorting system may be used with any number of traditional sorting systems perhaps as a subsequent sorting system or even as an initial sorting system. Traditional sorting systems may include but are not limited to magnets, eddy current, air separation, flotation, screening, sensor sorting, induction sensor sorting, X-ray, any combination thereof, or the like as one skilled in the art would understand. Magnets may pull out ferrous materials including ferrous nuggets. Magnets may also attract magnetic fuzz which may be undesirable when trying to separate recyclable ferrous materials. Therefore, processing automobile shredder residue in substantially isotropic quantization sorting systems prior to use with magnetic sorting systems may be desirable to remove materials detrimental to the magnetic sorting system and may provide a cleaner product. This may also apply with zorba and zurik perhaps generated from other systems.

When using a substantially isotropic quantization sorting system may be used as a pre-sorting technique, collections of substantially isotropic quantized materials may be further processed and even purified in a subsequent sorting system. Some of the collected substantially isotropic quantized materials may be discarded as they may be determined to be substantially non-recyclable materials. The subsequent sorting system may take the recyclable materials or even other collections of substantially isotropic quantized materials and efficiently separate metals or even plastics from the collections. Due to the nature of the collections of substantially isotropic quantized materials and perhaps even the removal of magnetic fuzz, entanglements, and other trash from the automobile shredder residue with the substantially isotropic quantization separation systems, the effectiveness of the subsequent sorting systems may result in cleaner, better, and usable materials for recycling.

When using a substantially isotropic quantization sorting system may be used as a post-sorting technique, an initial sorting system may be responsive to automobile shredder residue where it may be initially processed in any of the various traditional sorting systems providing separated materials. At least some recyclable materials may be sorted from the initial sorting system. The separated materials received from the initial sorting system or systems may then be introduced into a substantially isotropic quantization sorting system. In embodiments, separated materials may include but are not limited to zorba, zurik, trash, nonferrous trash, automobile shredder residue or the like. Of course, embodiments of the present invention may include both pre-sort and post-sort techniques, re-processing of materials in any of the various sorting systems including a substantially isotropic quantization sorting system and any combination thereof.

Figure 4:
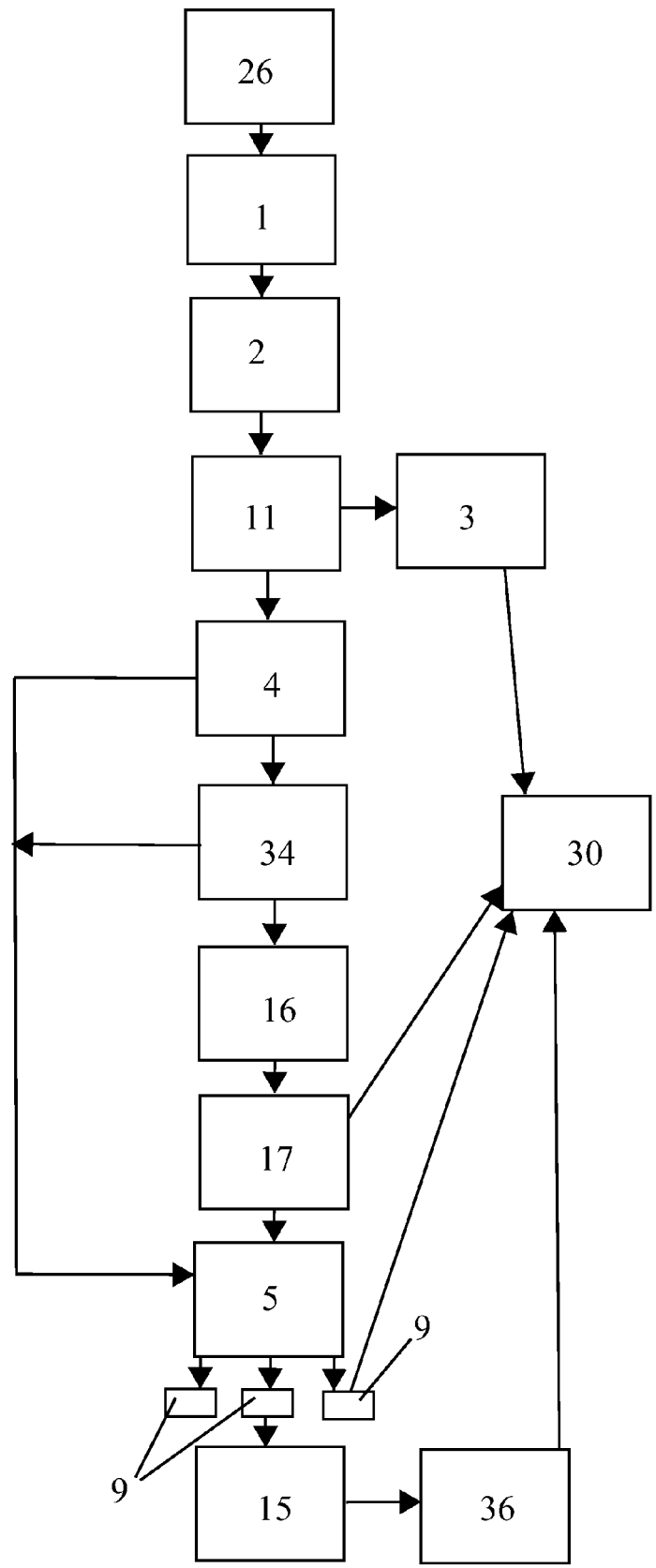
FIG. 4 shows a block diagram of an example of the processes used with enhanced separation of recyclable products from automobile shredder residue.

FIG. 4 is a block diagram representing a non-limiting example of an overall system. Some of the steps or systems may or may not be used and the order of the steps may be varied as needed. As mentioned above, an automobile shredder and metal reclamation process may include shredder materials (26) processed in an automobile shredder system (1) providing a plurality of shredded pieces (1). The shredded pieces may be sorted and a collection of ferrous metals (3) may be recycled (30) leaving a plurality of automobile shredder residue (4) behind. The automobile shredder residue (4) may be sized (34) and may even be processed through an initial sorting system (16) to provide separated materials (17) from the initial sorting system (16). At least some of the separated materials (17) may be recycled (30). At least some, if not all, of the separated materials (17) or even the automated shredder residue (4) or even sized (34) automated shredder residue may be processed in a substantially isotropic quantization separation system (5) such as a wind tunnel sorting system to provide a collection, or even a series of collections of substantially isotropic quantized materials (9). At least some of the collected substantially isotropic quantized materials (9) may be recycled (30). At least one of the collections of substantially isotropic quantized materials (9) may be processed in a subsequent sorting system (15) to provide recyclable materials (36) from the subsequent sorting system (15). The recyclable materials (36) may be recycled (30). Recycling may be with a recycle element as one skilled in the art would understand. Embodiments of the present invention may provide an automated system or even a partially automated system where each of the process steps may be accomplished in an automated or even partially automated fashion. Movement of materials from one step to another may be accomplished by manual labor, conveyer belts, truck transportation, and the like.

As can be easily understood from the foregoing, the basic concepts of the present invention may be embodied in a variety of ways. It involves both automobile shredder residue sorting techniques as well as devices to accomplish the appropriate automobile shredder residue sorter. In this application, the automobile shredder residue sorting techniques are disclosed as part of the results shown to be achieved by the various devices described and as steps which are inherent to utilization. They are simply the natural result of utilizing the devices as intended and described. In addition, while some devices are disclosed, it should be understood that these not only accomplish certain methods but also can be varied in a number of ways. Importantly, as to all of the foregoing, all of these facets should be understood to be encompassed by this disclosure.

The discussion included in this application is intended to serve as a basic description. The reader should be aware that the specific discussion may not explicitly describe all embodiments possible; many alternatives are implicit. It also may not fully explain the generic nature of the invention and may not explicitly show how each feature or element can actually be representative of a broader function or of a great variety of alternative or equivalent elements. Again, these are implicitly included in this disclosure. Where the invention is described in device-oriented terminology, each element of the device implicitly performs a function. Apparatus claims may not only be included for the device described, but also method or process claims may be included to address the functions the invention and each element performs. Neither the description nor the terminology is intended to limit the scope of the claims that will be included in any subsequent patent application.

It should also be understood that a variety of changes may be made without departing from the essence of the invention. Such changes are also implicitly included in the description. They still fall within the scope of this invention. A broad disclosure encompassing both the explicit embodiment(s) shown, the great variety of implicit alternative embodiments, and the broad methods or processes and the like are encompassed by this disclosure and may be relied upon when drafting the claims for any subsequent patent application. It should be understood that such language changes and broader or more detailed claiming may be accomplished at a later date (such as by any required deadline) or in the event the applicant subsequently seeks a patent filing based on this filing. With this understanding, the reader should be aware that this disclosure is to be understood to support any subsequently filed patent application that may seek examination of as broad a base of claims as deemed within the applicant's right and may be designed to yield a patent covering numerous aspects of the invention both independently and as an overall system.

Further, each of the various elements of the invention and claims may also be achieved in a variety of manners. Additionally, when used or implied, an element is to be understood as encompassing individual as well as plural structures that may or may not be physically connected. This disclosure should be understood to encompass each such variation, be it a variation of an embodiment of any apparatus embodiment, a method or process embodiment, or even merely a variation of any element of these. Particularly, it should be understood that as the disclosure relates to elements of the invention, the words for each element may be expressed by equivalent apparatus terms or method terms—even if only the function or result is the same. Such equivalent, broader, or even more generic terms should be considered to be encompassed in the description of each element or action. Such terms can be substituted where desired to make explicit the implicitly broad coverage to which this invention is entitled. As but one example, it should be understood that all actions may be expressed as a means for taking that action or as an element which causes that action. Similarly, each physical element disclosed should be understood to encompass a disclosure of the action which that physical element facilitates. Regarding this last aspect, as but one example, the disclosure of a "collection" should be understood to encompass disclosure of the act of "collecting"—whether explicitly discussed or not—and, conversely, were there effectively disclosure of the act of "collecting", such a disclosure should be understood to encompass disclosure of a "collection" and even a "means for collecting." Such changes and alternative terms are to be understood to be explicitly included in the description. Further, each such means (whether explicitly so described or not) should be understood as encompassing all elements that can perform the given function, and all descriptions of elements that perform a described function should be understood as a non-limiting example of means for performing that function.

Any patents, publications, or other references mentioned in this application for patent are hereby incorporated by reference. Any priority case(s) claimed by this application is hereby appended and hereby incorporated by reference. In addition, as to each term used it should be understood that unless its utilization in this application is inconsistent with a broadly supporting interpretation, common dictionary definitions should be understood as incorporated for each term and all definitions, alternative terms, and synonyms such as contained in the Random House Webster's Unabridged Dictionary, second edition are hereby incorporated by reference. Finally, all references listed in the information statement filed with the application are hereby appended and hereby incorporated by reference, however, as to each of the above, to the extent that such information or statements incorporated by reference might be considered inconsistent with the patenting of this/these invention(s) such statements are expressly not to be considered as made by the applicant(s).

Thus, the applicant(s) should be understood to have support to claim and make a statement of invention to at least: i) each of the sorting devices as herein disclosed and described, ii) the related methods disclosed and described, iii) similar, equivalent, and even implicit variations of each of these devices and methods, iv) those alternative designs which accomplish each of the functions shown as are disclosed and described, v) those alternative designs and methods which accomplish each of the functions shown as are implicit to accomplish that which is disclosed and described, vi) each feature, component, and step shown as separate and independent inventions, vii) the applications enhanced by the various systems or components disclosed, viii) the resulting products produced by such systems or components, ix) each system, method, and element shown or described as now applied to any specific field or devices mentioned, x) methods and apparatuses substantially as described hereinbefore and with reference to any of the accompanying examples, xi) an apparatus for performing the methods described herein comprising means for performing the steps, xii) the various combinations and permutations of each of the elements disclosed, xiii) each potentially dependent claim or concept as a dependency on each and every one of the independent claims or concepts presented, and xiv) all inventions described herein.

With regard to claims whether now or later presented for examination, it should be understood that for practical reasons and so as to avoid great expansion of the examination burden, the applicant may at any time present only initial claims or perhaps only initial claims with only initial dependencies. The office and any third persons interested in potential scope of this or subsequent applications should understand that broader claims may be presented at a later date in this case, in a case claiming the benefit of this case, or in any continuation in spite of any preliminary amendments, other amendments, claim language, or arguments presented, thus throughout the pendency of any case there is no intention to disclaim or surrender any potential subject matter. It should be understood that if or when broader claims are presented, such may require that any relevant prior art that may have been considered at any prior time may need to be re-visited since it is possible that to the extent any amendments, claim language, or arguments presented in this or any subsequent application are considered as made to avoid such prior art, such reasons may be eliminated by later presented claims or the like. Both the examiner and any person otherwise interested in existing or later potential coverage, or considering if there has at any time been any possibility of an indication of disclaimer or surrender of potential coverage, should be aware that no such surrender or disclaimer is ever intended or ever exists in this or any subsequent application. Limitations such as arose in *Hakim* v. *Cannon Avent Group, PLC*, 479 F.3d 1313 (Fed. Cir 2007), or the like are expressly not intended in this or any subsequent related matter. In addition, support should be understood to exist to the degree required under new matter laws—including but not limited to European Patent Convention Article 123(2) and United States Patent Law 35 USC 132 or other such laws—to permit the addition of any of the various dependencies or other elements presented under one independent claim or concept as dependencies or elements under any other independent claim or concept. In drafting any claims at any time whether in this application or in any subsequent application, it should also be understood that the applicant has intended to capture as full and broad a scope of coverage as legally available. To the extent that insubstantial substitutes are made, to the extent that the applicant did not in fact draft any claim so as to literally encompass any particular embodiment, and to the extent otherwise applicable, the applicant should not be understood to have in any way intended to or actually relinquished such coverage as the applicant simply may not have been able to anticipate all eventualities; one skilled in the art, should not be reasonably expected to have drafted a claim that would have literally encompassed such alternative embodiments.

Further, if or when used, the use of the transitional phrase "comprising" is used to maintain the "open-end" claims herein, according to traditional claim interpretation. Thus, unless the context requires otherwise, it should be understood that the term "comprise" or variations such as "comprises" or "comprising", are intended to imply the inclusion of a stated element or step or group of elements or steps but not the exclusion of any other element or step or group of elements or steps. Such terms should be interpreted in their most expansive form so as to afford the applicant the broadest coverage legally permissible. All claims are incorporated into the specification of this application and the dependent claims of the incorporated claims are hereby amended to include the phrase, "or any other claim." The use of the phrase, "or any other claim" is used to provide support for any claim to be dependent on any other claim, such as another dependent claim, another independent claim, a previously listed claim, a subsequently listed claim, and the like. As one clarifying example, if a claim were dependent "on claim 20 or any other claim" or the like, it could be re-drafted as dependent on claim 1, claim 15, or even claim 25 (if such were to exist) if desired and still fall with the disclosure. It should be understood that this phrase also provides support for any combination of elements in the claims and even incorporates any desired proper antecedent basis for certain claim combinations such as with combinations of method, apparatus, process, and the like claims.

Finally, any claims set forth at any time are hereby incorporated by reference as part of this description of the invention, and the applicant expressly reserves the right to use all of or a portion of such incorporated content of such claims as additional description to support any of or all of the claims or any element or component thereof, and the applicant further expressly reserves the right to move any portion of or all of the incorporated content of such claims or any element or component thereof from the description into the claims or vice-versa as necessary to define the matter for which protection is sought by this application or by any subsequent continuation, division, or continuation-in-part application thereof, or to obtain any benefit of, reduction in fees pursuant to, or to comply with the patent laws, rules, or regulations of any country or treaty, and such content incorporated by reference shall survive during the entire pendency of this application including any subsequent continuation, division, or continuation-in-part application thereof or any reissue or extension thereon.

What is claimed is:

1. A method of enhanced separation of automobile shredder residue comprising the steps of:
   providing an automobile shredder system;
   producing shredded pieces from said automobile shredder system;
   magnetically sorting said shredded pieces to create a collection of metals distinct from a collection of automobile shredder residue;
   introducing said automobile shredder residue into a wind tunnel sorting system;
   air locking said wind tunnel sorting system;
   providing a gravitationally influenced descent of said automobile shredder residue in said wind tunnel sorting system to create a substantially vertical, free-falling flow of residue;
   horizontally laminar flowing air through said wind tunnel sorting system into said substantially vertical, free-falling flow of residue;
   dynamically influencing said gravitationally influenced descent of at least some of said automobile shredder residue with said horizontally laminar flowing air so that at least some of said automobile shredder residue is carried with said laminar flowing air in said wind tunnel sorting system;
   substantially isotropic quantization separating said automobile shredder residue in said wind tunnel sorting system by said horizontally laminar flowing air scattering said automobile shredder residue;
   categorizingly collecting said automobile shredder residue as said automobile shredder residue variably descends in said wind tunnel sorting system;
   providing a series of collected substantially isotropic quantized materials;
   discarding some of said series of collected substantially isotropic quantized materials that are substantially non-recyclable materials;
   purifying some of said series of collected substantially isotropic quantized materials that are substantially recyclable materials in a subsequent sorting system;
   separating metals or plastics from said recyclable materials of said series of said collected substantially isotropic quantized materials with said subsequent sorting system; and
   recycling said metals or plastics recovered from said subsequent separation system.

2. A method of enhanced separation of automobile shredder residue as described in claim 1 wherein said automobile shredder residue is selected from a group consisting of magnetic fuzz, dirt, non-metallic waste, trash, metals, ferrous metals, nonferrous metals, light trash, heavy trash, glass, plastic, wood, aluminum, copper, zinc, brass, lead, stainless steel, magnesium, nickel, tin, insulated copper wire, and any combination thereof.

3. A method of enhanced separation of automobile shredder residue as described in claim 1 wherein said step of horizontally laminar flowing air through said wind tunnel sorting system comprises the step of horizontally laminar flowing air through said wind tunnel sorting system at a variable air velocity.

4. A method of enhanced separation of automobile shredder residue as described in claim 3 wherein said step of horizontally laminar flowing air through said wind tunnel sorting system at said variable air velocity comprises the step of providing a different air velocity at a material introduction section of said wind tunnel sorting system than at a downstream section of said wind tunnel sorting system.

5. A method of enhanced separation of automobile shredder residue as described in claim 1 wherein said step of dynamically influencing said gravitationally influenced descent comprises the step of sorting heavier materials from lighter materials.

6. A method of enhanced separation of automobile shredder residue as described in claim 1 wherein said step of substantially isotropic quantization separating comprises the step of substantially homogenously separating.

7. A method of enhanced separation of automobile shredder residue as described in claim 1 wherein said step of substantially isotropic quantization separating comprises the step of substantially concentrating separating.

8. A method of enhanced separation of automobile shredder residue as described in claim 1 wherein said step of substantially isotropic quantization separating comprises the step of separating a volume amount of fine-sized particles as waste from said automobile shredder residue, said amount of fine-sized particles as waste selected from a group consisting of between about 80% and about 90%, greater than about 75%, less than about 90%, about 75%, about 76%, about 77%, about 78%, about 79%, about 80%, about 81%, about 82%, about 83%, about 84%, about 85%, about 86%, about 87%, about 88%, about 89%, about 90%, about 91%, about 92%, about 93%, about 94%, and about 95%.

9. A method of enhanced separation of automobile shredder residue as described in claim 1 wherein said step of substantially isotropic quantization separating comprises the step of separating a volume amount of medium-sized particles as waste from said automobile shredder residue, said amount of waste selected from a group consisting of between about 20% to about 40%, at least about 20%, about 20%, about 21%, about 22%, about 23%, about 24%, about 25%, about 26%, about 27%, about 28%, about 29%, about 30%, about 31%, about 32%, about 33%, about 34%, about 35%, about 36%, about 37%, about 38%, about 39%, and about 40%.

10. A method of enhanced separation of automobile shredder residue as described in claim 1 wherein said step of substantially isotropic quantization separating comprises the step of increasing an amount of recyclable materials recovered from automobile shredder residue.

11. A method of enhanced separation of automobile shredder residue as described in claim 10 wherein said recyclable materials are selected from a group consisting of metals, nonferrous metals, ferrous metals, aluminum, copper, zinc, brass, lead, stainless steel, magnesium, nickel, tin, insulated copper wire, zorba, zurik, polymers, plastic and any combination thereof.

12. A method of enhanced separation of automobile shredder residue as described in claim 1 wherein said subsequent sorting system is selected from a group consisting of magnets, eddy current, air separation, flotation, screening, sensor sorting, induction sensor sorting, X-ray, and any combination thereof.

13. A method of enhanced separation of automobile shredder residue as described in claim 1 and further comprising the step of sizing said automobile shredder residue.

14. A method of enhanced separation of automobile shredder residue as described in claim 1 wherein said step of providing said automobile shredder system comprises the step of shredding materials selected from a group consisting of automobiles, trucks, buses, household appliances, washers, dryers, refrigerator, sheet metal, scraps, and waste metal.

15. A method of enhanced separation of automobile shredder residue as described in claim 1 wherein said step of horizontally laminar flowing air through said wind tunnel sorting system comprises the step of horizontally laminar flowing air through said wind tunnel sorting system at an air velocity selected from a group consisting of between about 15 and about 60 miles per hour, between about 15 and about 35 miles per hour, about 28 miles per hour, between about 35 and about 60 miles per hour, and about 40 miles per hour.

16. A method of enhanced separation of automobile shredder residue as described in claim 1 wherein said step of horizontally laminar flowing air through said wind tunnel sorting system comprises the step of horizontally laminar flowing air through said wind tunnel sorting system with an air aligner.

17. A method of enhanced separation of automobile shredder residue as described in claim 1 wherein said wind tunnel sorting system comprises a closed loop wind tunnel sorting system.

18. A method of enhanced separation of automobile shredder residue as described in claim 1 wherein said step of dynamically influencing said gravitationally influenced descent of at least some of said automobile shredder residue with said horizontally laminar flowing air so that at least some of said automobile shredder residue is carried with said laminar flowing air in said wind tunnel sorting system comprises the step of carrying light material with said horizontally laminar flowing air into a cyclone.

19. A method of enhanced separation of automobile shredder residue as described in claim 18 wherein said light material is selected from a group selected from a group consisting of trash, magnetic fuzz, and dirt.

20. A method of enhanced separation of automobile shredder residue as described in claim 19 and further comprising the step of removing said light material from said laminar flowing air in said cyclone.

* * * * *